(12) United States Patent
Kipnis (10) Patent No.: US 10,167,046 B2
(45) Date of Patent: Jan. 1, 2019

(54) VEHICLE WITH WEIGHT-BASED DRIVE MECHANISM

(71) Applicant: Michael Kipnis, Wheeling, IL (US)

(72) Inventor: Michael Kipnis, Wheeling, IL (US)

(73) Assignee: Cyclazoom, LLC, Evanston, IL (US)

( * ) Notice: Subject to any disclaimer, the term of this patent is extended or adjusted under 35 U.S.C. 154(b) by 0 days.

(21) Appl. No.: 15/412,962

(22) Filed: Jan. 23, 2017

(65) Prior Publication Data

US 2017/0217536 A1   Aug. 3, 2017

Related U.S. Application Data

(60) Provisional application No. 62/288,611, filed on Jan. 29, 2016.

(51) Int. Cl.
| | |
|---|---|
| *B62M 1/24* | (2013.01) |
| *B62M 9/02* | (2006.01) |
| *B62M 1/28* | (2013.01) |
| *B62K 3/00* | (2006.01) |
| *B62M 6/55* | (2010.01) |
| *B62M 6/90* | (2010.01) |

(52) U.S. Cl.
CPC ............... *B62M 1/24* (2013.01); *B62M 1/28* (2013.01); *B62M 9/02* (2013.01); *B62K 3/005* (2013.01); *B62M 6/55* (2013.01); *B62M 6/90* (2013.01); *B62M 2700/006* (2013.01)

(58) Field of Classification Search
CPC . B62M 1/24; B62M 9/02; B62M 6/55; B62M 6/90; B62K 3/005
USPC ....... 280/217, 252, 253, 256, 257, 259, 260, 280/261
See application file for complete search history.

(56) References Cited

U.S. PATENT DOCUMENTS

| | | | |
|---|---|---|---|
| 608,674 A * | 8/1898 | Harshner | ............... B62M 11/00 |
| | | | 280/257 |
| 2,141,967 A * | 12/1938 | Ball, Jr. | .................. B62L 3/023 |
| | | | 188/152 |

(Continued)

FOREIGN PATENT DOCUMENTS

| | | |
|---|---|---|
| WO | 2006002577 A1 | 1/2006 |
| WO | 2006059003 A1 | 6/2006 |

OTHER PUBLICATIONS

Search Report and Written Opinion for International Application No. PCT/US17/015596 dated May 26, 2017.

*Primary Examiner* — Jacob D Knutson
(74) *Attorney, Agent, or Firm* — Brian Roffe (57) ABSTRACT

Vehicle including a frame, a seat mounted to the frame, wheels rotatably mounted on the frame, and drive mechanisms for causing rotation of one wheel. Each drive mechanism includes an arm pivotally attached to the frame at one end, a weight and attached pedal at an opposite end of the arm, and a guide member including a bump and that moves in conjunction with movement of the weight. The guide member has a first end region at which the guide member is pivotally attached to the frame and a second, opposite end region which is free. A roller attached to the arm moves along the guide member during pivotal movement of the arm to cause pivoting of the guide member as the roller engages with the bump. An energy transfer system converts pivotal movement of the guide member into motive power to rotate the wheel.

21 Claims, 8 Drawing Sheets

(56) References Cited

U.S. PATENT DOCUMENTS

| | | | | |
|---|---|---|---|---|
| 3,039,790 A | * | 6/1962 | Trott | B62M 1/28 280/251 |
| 3,888,334 A | * | 6/1975 | Mack | B62L 3/08 188/24.17 |
| 3,888,344 A | * | 6/1975 | Major | B65G 25/10 198/718 |
| 3,954,282 A | * | 5/1976 | Hege | B62M 1/28 280/251 |
| 4,026,571 A | * | 5/1977 | Vereyken | B62M 1/28 280/251 |
| 4,077,648 A | | 3/1978 | Seul | |
| 4,134,481 A | * | 1/1979 | Calderazzo | B62L 5/003 188/24.17 |
| 4,456,276 A | | 6/1984 | Bortolin | |
| 4,574,649 A | | 3/1986 | Seal | |
| 4,666,173 A | * | 5/1987 | Graham | B62M 1/26 280/255 |
| 4,846,488 A | | 7/1989 | Szadkowski | |
| 4,878,684 A | | 11/1989 | Lemle | |
| 5,035,678 A | | 7/1991 | Hageman | |
| 5,272,928 A | | 12/1993 | Young | |
| 5,290,054 A | | 3/1994 | Po | |
| 5,527,246 A | * | 6/1996 | Rodgers, Jr. | A63B 22/001 280/253 |
| 5,732,963 A | | 3/1998 | White | |
| 5,915,710 A | | 6/1999 | Miller | |
| 5,979,922 A | | 11/1999 | Becker et al. | |
| 6,000,707 A | | 12/1999 | Miller | |
| 6,007,083 A | | 12/1999 | Currie | |
| 6,173,981 B1 | | 1/2001 | Coleman | |
| 6,209,900 B1 | * | 4/2001 | Yoshizawa | B62M 1/26 280/252 |
| 6,237,928 B1 | | 5/2001 | Islas | |
| 6,340,067 B1 | * | 1/2002 | Fujiwara | B62M 1/26 180/206.3 |
| 6,412,802 B1 | | 7/2002 | Kugel et al. | |
| 6,730,003 B1 | * | 5/2004 | Phillips | A63B 22/0046 482/57 |
| 7,048,290 B2 | | 5/2006 | Paquette | |
| 7,497,453 B2 | | 3/2009 | Fan | |
| 7,559,264 B2 | | 7/2009 | Qian | |
| 7,753,387 B2 | | 7/2010 | Wei | |
| 8,157,281 B2 | | 4/2012 | Wang | |
| 8,215,654 B1 | | 7/2012 | Leser | |
| 8,955,861 B1 | | 2/2015 | Rasiah | |
| 8,967,022 B2 | | 3/2015 | Beard | |
| 8,979,107 B2 | | 3/2015 | Lin | |
| 9,688,349 B2 | | 6/2017 | Thompson | |
| 2002/0053779 A1 | | 5/2002 | Fujiwara et al. | |
| 2002/0074788 A1 | | 6/2002 | Fujiwara et al. | |
| 2003/0193160 A1 | | 10/2003 | Mehmet | |
| 2007/0228687 A1 | | 10/2007 | Parker | |
| 2011/0049830 A1 | * | 3/2011 | Hung | B62M 1/24 280/256 |
| 2011/0057411 A1 | | 3/2011 | Scolari et al. | |
| 2011/0115190 A1 | | 5/2011 | McIsaac | |
| 2014/0210179 A1 | | 7/2014 | Sprague | |
| 2014/0367940 A1 | * | 12/2014 | Lin | B62M 1/26 280/257 |
| 2015/0076787 A1 | | 3/2015 | Kipnis | |

* cited by examiner

VEHICLE WITH WEIGHT-BASED DRIVE MECHANISM

CROSS-REFERENCE TO RELATED APPLICATION

This application claims priority under 35 U.S.C. § 119 of U.S. provisional patent application Ser. No. 62/288,611 filed Jan. 29, 2016, which is incorporated by reference herein.

FIELD OF THE INVENTION

This invention is generally related to human-powered vehicles such as bicycles, tricycles and other multi-wheel variants and more specifically to such human-powered vehicles that are propelled by a reciprocating thrust motion of the operator using a double bump drive hammer powered mechanism connected by a power-gear to a double overrunning clutch transmission with optional returning springs. The human-powered vehicle is propelled with the use of pedals/hammers which are positioned in between wheels or approximately above and on either side of the front wheel.

BACKGROUND OF THE INVENTION

Recumbent human-powered vehicles, such as bicycles and tricycles and human-powered vehicles with linear drivers, are known in the prior art. Some examples of such vehicles are found in U.S. Pat. Nos. 4,574,649; 4,846,488; 4,878,684; 5,272,928; 5,290,054; 5,732,963; 5,915,710; 5,979,922; 6,173,981; and 7,048,290; and WO 2006 002577. Additional prior art references accumulate many of the problems described above.

SUMMARY OF THE INVENTION

A vehicle including a frame, a seat mounted to the frame, wheels rotatably mounted on the frame, and at least one drive mechanism for causing rotation of one of the wheels. Each drive mechanism includes an arm pivotally attached at first end region to the frame, a weight arranged on the arm at an opposite, second end region, a pedal attached to the weight and configured such that a user of the vehicle when present in the seat can move the pedal and thus the weight and cause pivoting of the arm, and a guide member including a bump and that moves in conjunction with movement of the weight. The guide member has a first end region at which the guide member is pivotally attached to the frame and a second, opposite end region which is free. A roller is attached to the arm and movable along the guide member during pivotal movement of the arm to cause pivoting of the guide member as the roller engages with the bump of the guide member. An energy transfer system converts pivotal movement of the guide member into motive power to rotate the wheel.

In one embodiment, the frame includes a downward oriented extension, and the first end region of the guide member is pivotally attached to the extension such that the second end region of the guide member is above the first end region. The bump is oriented in a rearward direction such that the roller is positioned rearward of the guide member. The energy transfer system includes an overrunning clutch mechanism having an outer ring and an inner ring configured such that rotation of the outer ring in a first direction causes rotation of the inner ring while rotation of the outer ring in a second, opposite direction does not cause rotation of the inner ring, and a drive chain passing around an axle of the wheel. The inner ring is motively coupled to the drive chain such that rotation of the inner ring causes movement of the drive chain and results in rotation of the wheel. An elongate link is coupled at a first end region to the second end region of the guide member and coupled at a second, opposite end region to the outer ring, pivotal movement of the guide member causing pulling of the link and rotation of the outer ring in the first direction. By coupling, direct to indirect contact between the coupled members is possible. A roller is preferably attached to the frame and over which the link passes between coupling to the guide member and the outer ring. A drum is fixed to the outer ring, the second end region of the link being connected to the drum.

Further objects and advantages of this invention will become apparent from a consideration of the included figures with corresponding description.

DESCRIPTION OF THE DRAWINGS

The invention, together with further advantages thereof, may best be understood by reference to the following description taken in conjunction with the accompanying drawings, wherein like reference numerals identify like elements, and wherein.

DETAILED DESCRIPTION OF THE INVENTION

Figure 1:
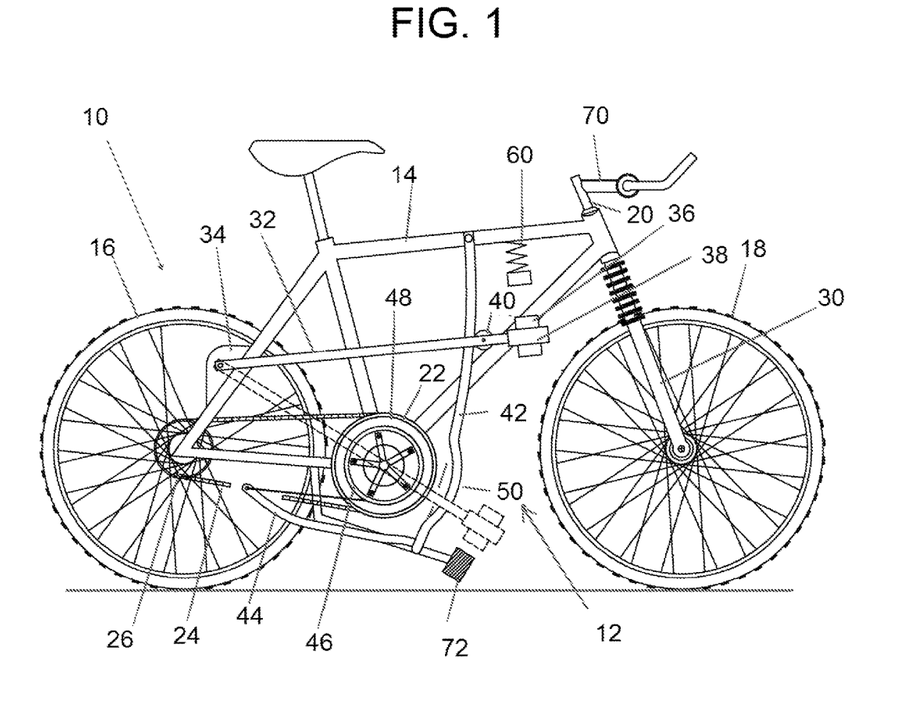
FIG. 1 is a side view of an embodiment of a bicycle of the present invention.
Figure 2:
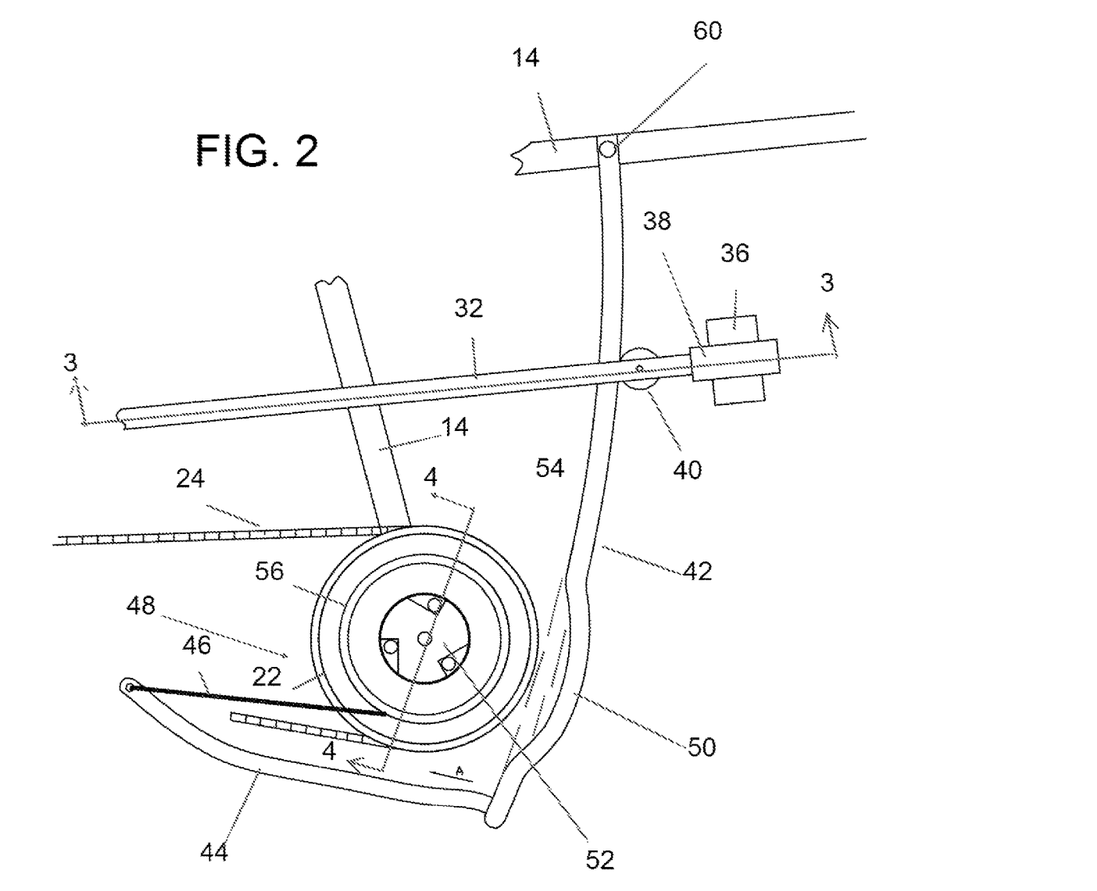
FIG. 2 is an enlarged side view of the transmission mechanism of the bicycle shown in FIG. 1.

Referring to the accompanying drawings wherein the same reference numbers refer to the same or similar elements, FIG. 1 shows a bicycle 10 in accordance with the invention that has a double-stroke inertial hammer-powered gear drive mechanism 12 integral with a bicycle frame 14. The bicycle 10 has many standard components found in typical bicycles, such as a rear wheel 16, front wheel 18, steering column 20, main drive sprocket 22 (also referred to as the main drive sprocket plate), main drive chain 24, rear wheel drive sprocket 26 (also referred to as the rear wheel drive sprocket plate), adjustable handlebar 28, and a front fork 30. Bicycle 10 may include alternative or other components known to be used on bicycles as long as they do not interfere with the drive mechanism 12.

Mechanism 12, of which there is one on each side of the bicycle assuming the bicycle is made for use with both left and right feet of the rider, includes a rigid arm 32, pivotally attached at one end region to a plate 34 attached to the frame 14, a weight 36 attached to the opposite end region of the arm 32, a pedal 38 attached to either the weight 36 or the end region of the arm 32 at which the weight 36 is attached, and a roller 40 rotatably mounted to the arm 32 rearward of the weight 36 and pedal 38. Weight 36 may be connected to the same axle as pedal 38, and the weight 36 situated on an opposite side of the arm 32 from the pedal 38 (see FIG. 3). The pedal 38 may include a strap or basket to better facilitate movement of the pedal 38 in the manner described below. This component constitutes the actuating part of the mechanism 12.

Mechanism 12 also includes a force transmission part which includes a rigid bar 42 pivotally attached at one end region to the frame 14 (for example, defining a pivot axis via a pivot pin 60), and having a rearwardly oriented extension 44 at or proximate to the opposite end region. Bar 42 may be, but is not required to be, hollow as shown, and is also referred as a guide member herein. A link 46 is connected at one end region to the free end of the extension 44 and at an opposite end region to a part of a clutch mechanism 48. Link 46 is a power link or chain and may be a vinyl-coated metal cord, a metal chain or other similar components.

An important feature of the invention is that the bar 42 includes a discernible bump 50. Bump 50 is an example of a deviation radially outward of a radius of curvature that the bar 40 generally follows (represented by the dotted lines in FIG. 1). The dotted lines in FIG. 1, however, represent the permitted path of the bar 42 arising from the fixed length between the roller 40 and the pivot point at which the arm 32 is attached to the frame 14. Bump 50 thereby causes the bar 42 to pivot rearward about the pivot point defined on the frame 14 as the roller 40 passes over the forward surface of the bump 50. This pivotal rearward movement causes rearward movement of extension 44, the effect of which is described below.

Clutch mechanism 48 is an overrunning clutch, the general design of which is known to those skilled in the transmission field. Generally, an overrunning clutch has outer and inner rings 52 and 54 (see FIG. 4). Rings 52, 54 are alternatively considered or termed races or gears, or other comparable terminology used by those in the transmission field. A drum 56 is connected to the outer ring 54. The link 46 is connected to the drum 56. Outer and inner rings 52, 54 are configured such that when outer ring 54 rotates in one direction (clockwise in the configuration shown in FIG. 1), the inner ring 52 is engaged with the outer ring 54 and rotates as well in the same direction. However, when outer ring 54 rotates in the opposite direction (counterclockwise in the configuration shown in FIG. 1), the inner ring 52 is disengaged with the outer ring 54 and does not rotate.

Figure 4:
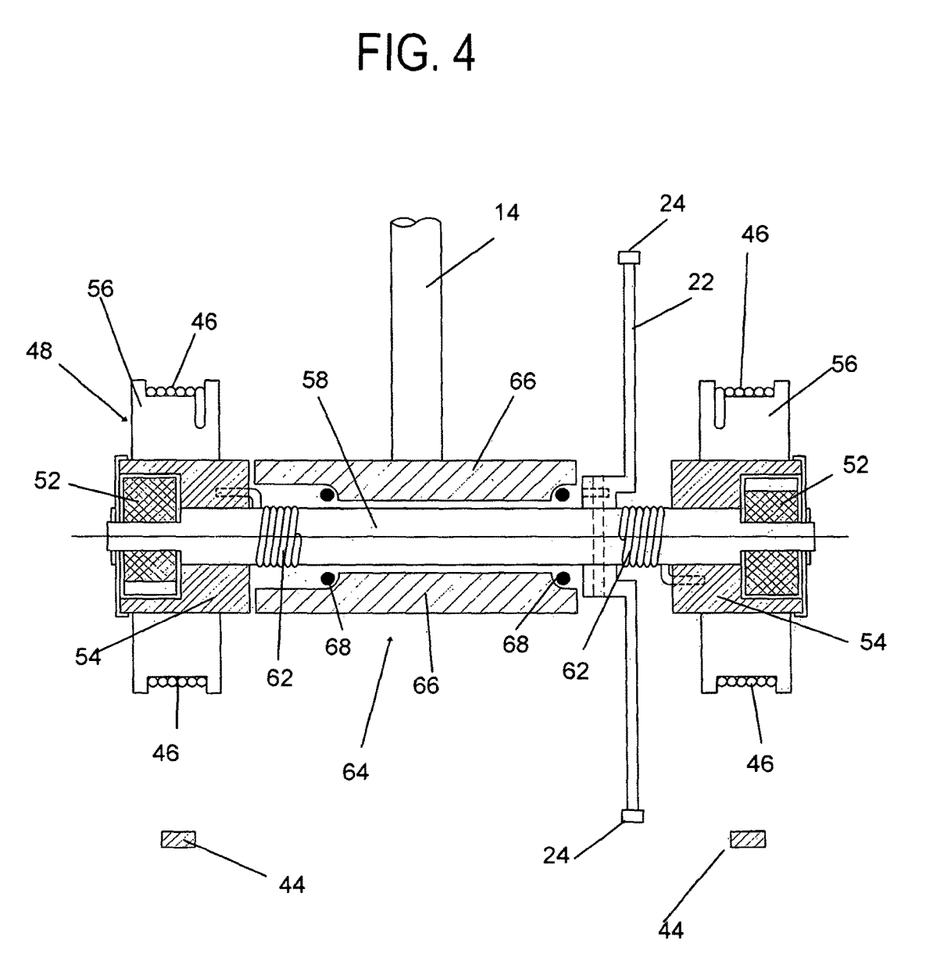
FIG. 4 is a cross-sectional view taken along the line 4-4 in FIG. 2.

Rotation of the inner ring 52 is transmitted to the rear wheel 16 via a main drive sprocket plate 22 which is fixed to a transmission axle 58 to which the inner ring 52 is fixed (see FIG. 4), a drive chain 24 that passes around the outer periphery of the main drive sprocket plate 22 (shown in FIG. 1 but not FIG. 4).

Clockwise rotation of the outer ring 54 is caused by pulling of the link 46, which causes the drum 56 to rotate clockwise and thus the outer ring 54 to rotate clockwise in view of its fixing to the drum 56 (see FIG. 4).

Biasing members, such as spiral torsional springs 62, are provided to cause the counterclockwise rotation of the outer ring 54 (FIG. 4).

Additional features of the clutch mechanism 48 includes a transmission main chain axis drive 64 having the transmission axle 58 located in the transmission bracket 66 and bearings 68 between an inner surface of the transmission bracket 66 and an outer surface of the transmission axle 58 to enable rotation of transmission axle 58 relative to the transmission bracket 66.

Additional features of the bicycle 10 include a set of movement limiters 70, 72, one attached to the frame 14 in a position to limit the upward movement of the arm 32 by preventing upward movement of the weight, and the other attached to the frame 14 in a position below the bar 42 to limit the downward movement of the arm 32. Each movement limiter 70, 72 may include a spring to aid the movement of the arm in the return direction.

Figure 3:
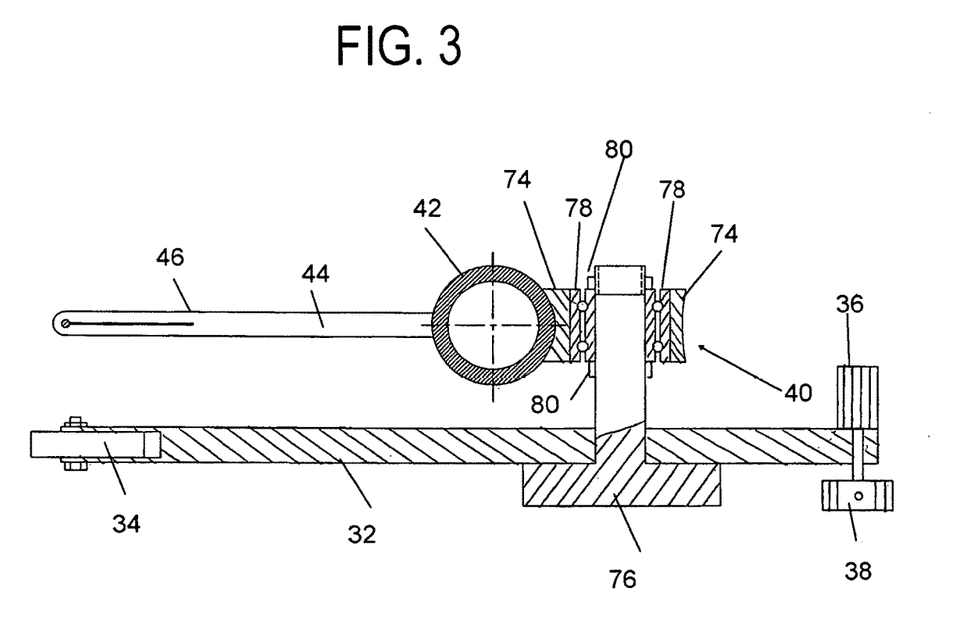
FIG. 3 is a cross-sectional view taken along the line 3-3 in FIG. 2.

Roller 40 and bar 42 can interact with one another in a variety of different ways with the purpose being to allow the roller 40 to roll along the bar 42. As shown in FIG. 3, the roller 40 is situated forward of the bar 42 and includes a roller pad 74 that contacts the outer surface of the bar 42 and is support on a pin or axle 76 by a bearing 78. Axle 76 is a sturdy axle which is fixed to the arm 32. As shown, the fixing structure is a flange that extends through an aperture in the arm 32. Other fixing structures, e.g., a weld, adhesive, bolt, and the like, may be used in the invention. The bearing 78 is fixed on the axle 76 by supports 80. The contour of the pad 74 and the complementary contour of the bar 42 can be different from that shown in FIG. 3. The pad 74 may have a convex outer surface whereas the bar 42 is provided with a concave surface along that side which will be in contact with the pad 74.

In operation, from the state shown in FIG. 1, the rider sits on the seat and puts their feet on the pedals 38. The rider pushes one or both pedals 38 downward, As the pedal 38 moves downward, the arm 32 pivots about its pivot axis on the plate 34 and the roller 40 slides along the bar 42. Until the roller 40 reaches the bump 50, it is in a condition in which it is free-fall and is acquiring energy. That is, it is converting potential energy into kinetic energy, and the magnitude of the change in energy is increased by the presence of the weight 36.

When the roller 40 contacts the bump 50, the bar 42 is pushed rearward, pivoted counterclockwise about the pivot point at which the bar 42 is attached to the frame 14. This rearward pushing causes the extension 44 to move rearward pulling the link 46. By pulling the link 46, the outer ring 54 is rotated clockwise, and in view of the engagement of the inner ring 52 with the outer ring 54, the inner ring 52 is rotated clockwise. This causes the main drive sprocket plate 22 to rotate clockwise, and the drive chain 24 that passes around the outer periphery of the main drive sprocket plate 22 to move and cause rotation of the rear wheel drive sprocket plate 26 which in turns causes rotation of the rear wheel 16.

Once the roller 40 passes by the bump 50, it releases energy and the weight 36 or pedal 38 contacts the movement limiter 72 at the end of the downward movement. During this time, the spring returns the link 46 to the starting position. However, the inner ring 52 is not engaged with the outer ring 54, so the counterclockwise rotation of the outer ring 54 is not transmitted to the inner ring 52.

Then, when the rider moves the pedal 38 upward, over the bump 50 from the bottom, the same effect occurs causing another transference of motive energy to the rear wheel 16. The upward movement of the arm 32 is limited by movement limiter 70.

The rider can therefore propel themselves forward using only one foot, using both feet in the same synced movement (downward at the same time and upward at the same time), or stagger movement (left foot down while right foot up, and vice versa). The rider has extreme versatility in use of the bicycle to move.

Figure 5:
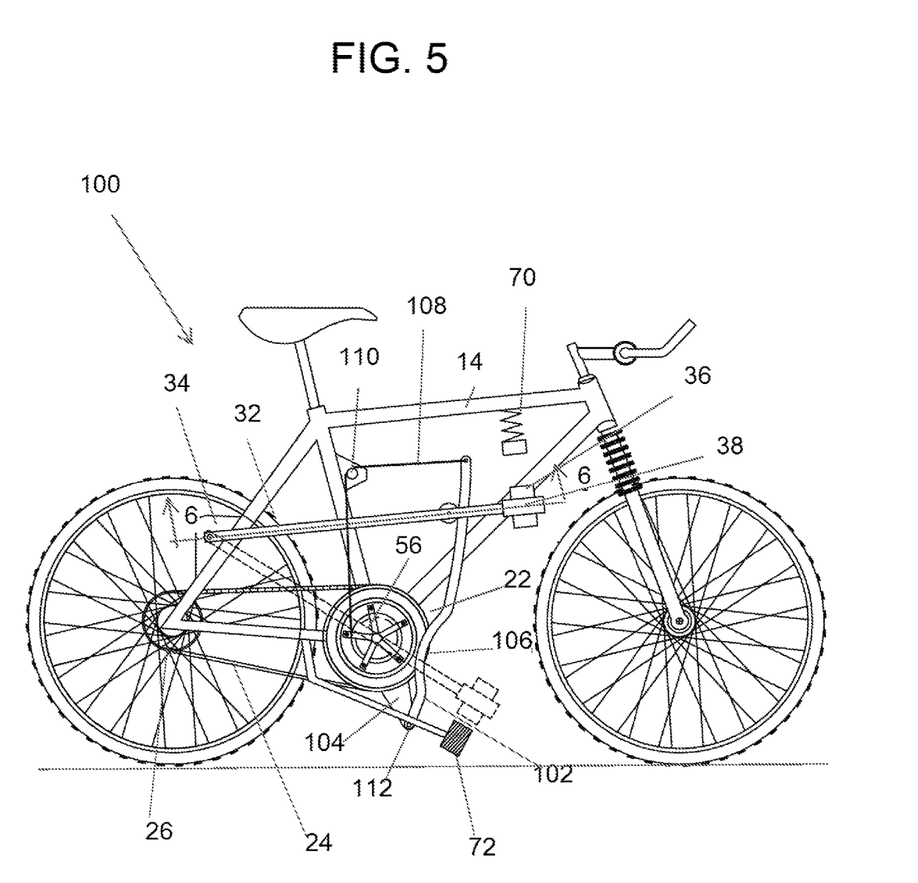
FIG. 5 is a side view of another embodiment of a bicycle of the present invention.
Figure 6:
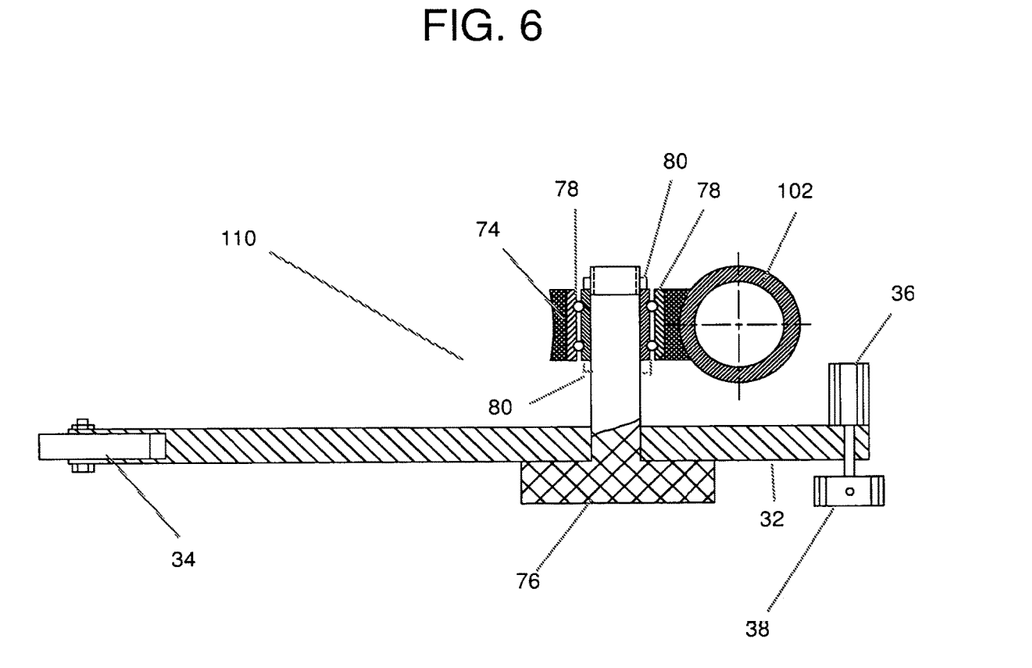
FIG. 6 is a cross-sectional view taken along the line 6-6 in FIG. 5.

FIGS. 5 and 6 show another embodiment of the invention designated 100 with a similar drive mechanism 12 but the manner in which the drive mechanism 12 is actuated is different. Bicycle 100 includes a bar 102 is attached at a lower pivot point 112 to an extension 104 from the frame 14. Bar 102 has a bump 106 oriented in the rearward direction, so that the roller 40 is positioned rearward of the bar 102, and may be, but is not required to be, hollow as shown. Orientation of the bump 106 in a rearward direction means that the bump 106 projects from a virtual radius of curvature of the bar 102 rearward, or toward the center of the virtual radius of curvature.

A link 108 is attached at one end region to the upper end region 114 of the bar 102, passes around a roller 110 attached to the frame 14 and then attaches to the drum 56. Roller 110 is situated rearward of the bar 102. Link 108 has characteristics similar to link 46. Otherwise, the bicycle 100 has the same features as bicycle 10 and the same reference elements are used to designate the same components.

Operation of bicycle 100 differs from the operation of bicycle 10 in that as the pedal 38 moves downward, the arm 32 pivots about its pivot axis on the plate 34 and the roller 40 slides along a rearward surface of the bar 102. Until the roller 40 reaches the bump 106, it is in a condition in which it is free-fall and is acquiring energy. That is, it is converting potential energy into kinetic energy, and the magnitude of the change in energy is increased by the presence of the weight 36 attached to each pedal 38.

When the roller 40 contacts the bump 106, the bar 102 is pushed forward, pivoted clockwise about the pivot point at which the lower end region of the bar 102 is attached to the frame extension 104. This forward pushing causes the upper end region of the bar 102 to move forward pulling the link 108. By pulling the link 108, the outer ring 54 is rotated clockwise, and in view of the engagement of the inner ring 52 with the outer ring 54, the inner ring 52 is rotated clockwise. This causes the main drive sprocket plate 22 to rotate clockwise, and the drive chain 24 that passes around the outer periphery of the main drive sprocket plate 22 to move and cause rotation of the rear wheel drive sprocket plate 26 which in turn causes rotation of the rear wheel 16.

Once the roller 40 passes by the bump 106, it releases energy and the weight 36 or pedal 38 contacts the movement limiter 72 at the end of the downward movement. During this time, the spring returns the link 106 to the starting position. However, the inner ring 52 is not engaged with the outer ring 54, so the counterclockwise rotation of the outer ring 54 is not transmitted to the inner ring 52.

Then, when the rider moves the pedal 38 upward, over the bump 106 from the bottom, the same effect occurs causing another transference of motive energy to the rear wheel 16. The upward movement of the arm 32 is limited by movement limiter 70.

In the embodiments described above, the left and right power stroke cycles are independent from one another. Because of this independent action, the rider can use both legs simultaneously when necessary to provide more power to the vehicle, such as, for example, when accelerating, riding uphill or carrying larger loads (e.g., passengers in a rickshaw-like configuration). Likewise, the rider may alternate between left and right leg motion such as used in a typical upright or recumbent bicycle. Finally, the vehicle of this invention may be propelled with the use of either the right or left leg in a single-stroke action.

The drive mechanism 12 described above in the bicycle 10 shown in FIGS. 1-4, or the variant shown in FIGS. 5 and 6 can be incorporated into any type of wheeled vehicle, including a recumbent bicycle, a tricycle, etc. Different configurations of a bicycle into which drive mechanism 12 may be incorporated are disclosed in U.S. provisional patent application Ser. No. 62/288,611 filed Jan. 29, 2016, incorporated by reference herein. Also, the drive mechanism 12 may be configured to generate electricity as the inner ring 52 rotates which is stored in a battery on the bicycle 10, 100 and then used to rotate the rear wheel 16, in a similar manner as disclosed in the '611 application. The battery is charged whenever the inner ring 52 rotates. This electrical power is controlled by the rider or a mechanical speed regulator to provide for linear movement of the bicycle 10, 100 in a manner known to those skilled in the art in view of the disclosure herein.

In some embodiments, the rotation of the outer ring 54 may be used by a generator on the bicycle 10, 100 to generate electricity which is either directly used to power a motor associated with one or more of the wheels of the bicycle to provide motive power to the bicycle and/or is stored in a battery for later use. Use of a generator powered by pedal motion is disclosed in the '611 provisional application and can be applied to any of the embodiments disclosed herein.

It is also possible to construct the weight/pedal assembly so that it is moved in a linear manner and the linear motion of this assembly interacting with a guide member having a bump to cause the energy transfer system to transfer energy to the rear wheel 16. Application of linear motion instead of pivotal motion is disclosed in the '611 provisional application and can be applied to any of the embodiments disclosed herein.

Figure 7:
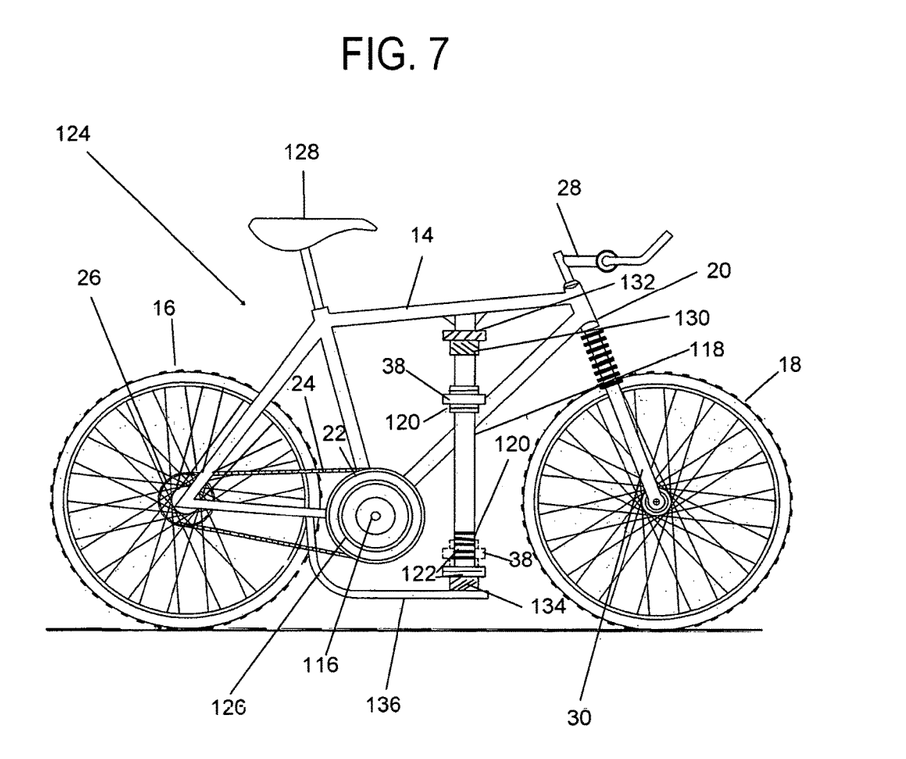
FIG. 7 is a side view of an embodiment of the present invention, incorporating vertical sliders for pedals/hammer weights which contain electrical generation elements which produces electrical power to move the vehicle and returning pedals/hammers weights—electrical springs.

FIG. 7 shows an embodiment wherein the rider's control of the pedals 38 causes generation of electricity which powers an electrical motor 116 that turns the rear wheel 16. An energy generating system is thus provided. A directional slider 118 is provided and an electrical coil assembly 120 is connected to each pedal 38 and another electrical coil assembly 122 is integrated into the directional slider 118 on each side of the bicycle 124, and thus serves as a stationary static electrical generator coil assembly. These electrical coil assemblies 120, 122 form an energy generating system that converts sliding movement of the weight (considered the combination of the pedal 38 and the electrical coil assembly 120) along the directional slider 118 into rotational force to rotate a flywheel 126.

More specifically, movement of the electrical coil assembly 120 relative to the stationary electrical coil assembly 122 on each directional slider 118 causes generation of electricity which is conveyed through wires on the bicycle 124 to a common electrical motor 116. Motor 116 may be housed in a housing attached to the frame 14. Motor 116 is electrically coupled to the flywheel 126 that causes rotation of the main drive sprocket plate 22 in turn, causing the main drive chain 24 to move and the rear wheel drive sprocket 26 to rotate thereby causing rotation of the rear wheel 16. There may be two motors and flywheels, one for each energy generating system, or a single motor and single flywheel that are powered by both energy generating systems.

In use, the rider sitting on seat 128 puts their feet on the pedals 38, one on each side of the frame 14, and then moves their feet up and down, causing vertical, linear movement of the electrical coil assembly 120 along the directional slider 118 and relative to the stationary electrical coil assembly 122. The uppermost position of the electrical coil assembly 120 is shown in solid lines while the lowermost position is shown in dotted lines. This relative movement of the coil assemblies 120, 122 generates electricity, in a manner known to those skilled in the art. The electrical coil assembly 120 may be integrated into a reciprocating electrical spring. It is of course possible for the rider to move only one of their feet up and down, and when moving both of their feet up and down, they can move their feet simultaneously in down stroke and up stroke, or alternatively in down and up stroke, i.e., one going down and the other going up.

A spring 130, representative of biasing means or a biasing member, is situated at the top of the directional slider 118 and in this embodiment, limits the upward movement of the electrical coil assembly 120 along the directional slider 118 and provides a reciprocating force if the electrical coil assembly 120 should come into contact with the spring 130 in its upward stroke. An optional spring 132 is above spring 130 and aids the function of spring 130. Similarly, a spring 134 is situated at the bottom of the directional slider 118 to limit the downward movement of the electrical coil assembly 120 along the directional slider 118 and provide a reciprocating force if the electrical coil assembly 120 should come into contact with the spring 134 in its downward stroke. Another spring 136 is connected to the spring 134 and is attached to the frame 14. The electrical wires between the electrical coil assemblies 120, 122 may pass through spring 136, or other parts of the frame 14.

Springs 130, 132, 134, 136 may be reciprocating electrical springs that generate electrical power and returning force at the same time. In this case, the springs 130, 132, 134, 136 are also connected by wires to the motor 116 and provide electrical energy to the motor 116. Electrical springs that generate electricity when contacted by a moving object are known.

Figure 8:
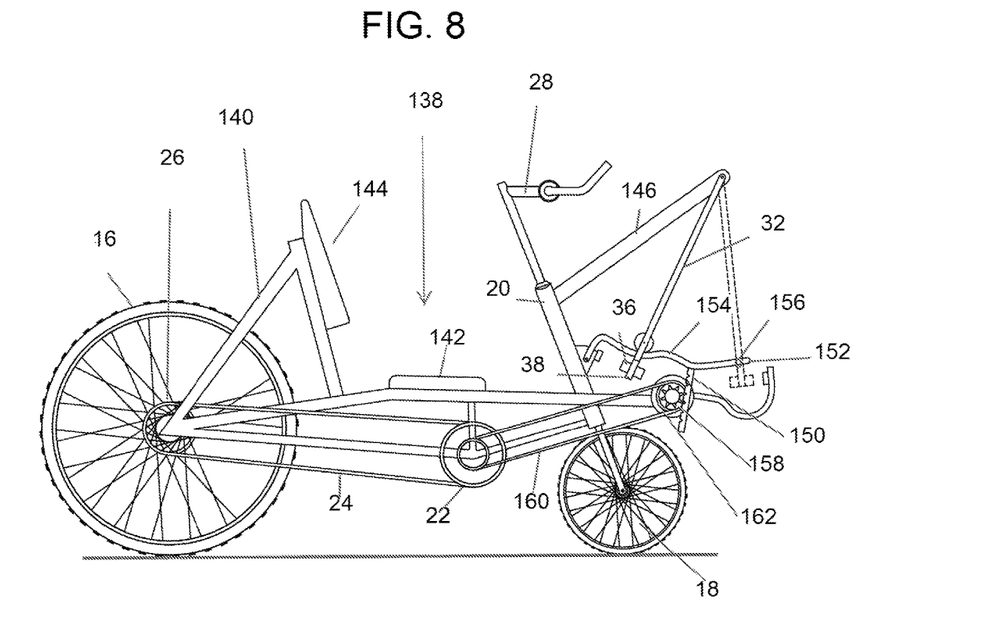
FIG. 8 is a side view of an embodiment of the transmission of the present invention, recumbent human power vehicle with slider/hammer handle associated with slider bracket attached to the steering column.

Referring now to FIG. 8, this embodiment of a bicycle 138 includes a frame 140 configured to allow the rider to sit on the seat 142 and rest their back on a backrest 144. Also, the arm 32 is pivotally connected to a pedal slider bracket 146 that is attached to the frame 14 and specifically to the steering column 20. The weight 36 is attached to the arm 32 to form a swinging hammer handle, and the pedal 38 is attached to the weight 36 or arm 32. By pivotally mounting the arm 32 at its upper end to the pedal slider bracket 146, a pivot point for the arm 32 is defined on the pedal slider bracket 146 and the arm 32 swings in a pendulum-type motion between a rearwardmost position shown in solid lines and a forwardmost position shown in dotted lines. Ratchet portion 150 of guide member 152 extends from the bump 154, and since the guide member 152 is generally in a horizontal orientation, the ratchet portion 150 extends in a generally vertical orientation.

For use, the rider puts their feet onto the pedals 38, one on each side of the frame 14 of the bicycle 138, and then pushes the pedal 38, with the connected weight 36, forward causing the arm 32 to swing forward. This swinging movement causes a roller 156 to move along the guide member 152. As the roller 156 rolls over the bump 154 in the guide member 152, the ratchet portion 150 of the guide member 152 is moved downward while in contact with a gear 158 causing rotation of the gear 158.

Rotation of gear 158 causes movement of a secondary drive chain 160 only when the arm 32 swings forward and not when the arm 32 swings rearward. This is achieved by an overrunning clutch 162 integrated with the gear 158. Thus, the secondary drive chain 160 does not move unless the inner ring of the overrunning clutch 162 is engaged with the outer ring of the overrunning clutch 162, which occurs only when the ratchet portion 150 of the guide member 152 moves downward and the gear 158 rotates clockwise, but not when the guide member 152 moves upward and the gear 158 rotates counterclockwise. Movement of the secondary drive chain 160 causes the main drive sprocket plate 22 to rotate which in turn, causes the main drive chain 24 to move and the rear wheel drive sprocket 26 to rotate thereby causing rotation of the rear wheel 16.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A vehicle, comprising:
    a frame;
    a seat mounted to said frame;
    a wheel rotatably mounted on said frame and having an axle;
    a main drive sprocket plate spaced apart from said axle of said wheel;
    a drive chain that couples said main drive sprocket plate to said axle of said wheel such that rotation of said main drive sprocket plate causes rotation of said axle of said wheel and thus rotation of said wheel, said drive chain passing around said axle of said wheel;
    at least one drive mechanism that causes rotation of said main drive sprocket plate and thereby cause rotation of said wheel;
    each of said at least one drive mechanism comprising:
        an arm pivotally attached at a first end region to said frame to pivot about a fixed pivot axis relative to said frame;
        a weight arranged on said arm at an opposite, second end region;
        a pedal attached to said weight, said pedal and thus said weight being movable by a user of the vehicle when present in said seat to cause pivoting of said arm; and
        an energy transfer system that converts pivotal movement of said arm about the fixed pivot axis into motive power to rotate said main drive sprocket plate and thus said wheel,
        said energy transfer system comprising:
            an overrunning clutch mechanism having an outer ring and an inner ring configured such that rotation of said outer ring in a first direction causes rotation of said inner ring while rotation of said outer ring in a second, opposite direction does not cause rotation of said inner ring, said inner ring being motively coupled to said drive chain such that rotation of said inner ring causes movement of said drive chain and results in rotation of said wheel; and
            an elongate link having a first end region that moves when said pedal moves and a second, opposite end region coupled to said outer ring, pivotal movement of said arm causing pulling of said link and rotation of said outer ring in the first direction; and
        a roller attached to said frame and over which said link passes.

2. The vehicle of claim 1, wherein said at least one drive mechanism comprises a pair of drive mechanisms, one of said drive mechanisms being arranged on each of a left side and a right side of the vehicle which are on opposite lateral sides of said frame.

3. The vehicle of claim 1, further comprising an axle extending through said arm at said second end region, said pedal and said weight being connected to said axle extending through said arm and positioned on opposite lateral sides of said arm.

4. The vehicle of claim 1, further comprising movement limiters attached to said frame to limit movement of said arm.

5. The vehicle of claim 1, wherein said energy transfer system further comprises a drum fixed to said outer ring, said second end region of said link being connected to said drum.

6. The vehicle of claim 1, wherein each of said at least one drive mechanism further comprises at least one biasing member that biases said outer ring to rotate in the second direction.

7. A vehicle comprising:
a frame;
a seat mounted to said frame;
a wheel rotatably mounted on said frame; and
at least one drive mechanism that causes rotation of said wheel;
each of said at least one drive mechanism comprising:
an arm pivotally attached at a first end region to said frame;
a weight arranged on said arm at an opposite, second end region;
a pedal attached to said weight, said pedal and thus said weight being movable by a user of the vehicle when present in said seat to cause pivoting of said arm;
a guide member including a bump and that moves in conjunction with movement of said weight, said guide member having a first end region at which said guide member is pivotally attached to said frame and a second, opposite end region which is free;
a roller attached to said arm and movable along said guide member during pivotal movement of said arm to cause pivoting of said guide member as said roller engages with said bump of said guide member; and
an energy transfer system that converts pivotal movement of said guide member into motive power to rotate said wheel.

8. The vehicle of claim 7, wherein said frame includes a downward oriented extension, said first end region of said guide member being pivotally attached to said extension such that said second end region of said guide member is above said first end region.

9. The vehicle of claim 8, wherein said bump is oriented in a rearward direction such that said roller is positioned rearward of said guide member.

10. The vehicle of claim 9, wherein said wheel includes an axle and said drive chain passes around said axle of said wheel, said energy transfer system comprising:
an overrunning clutch mechanism having an outer ring and an inner ring configured such that rotation of said outer ring in a first direction causes rotation of said inner ring while rotation of said outer ring in a second, opposite direction does not cause rotation of said inner ring, said inner ring being motively coupled to said drive chain such that rotation of said inner ring causes movement of said drive chain and results in rotation of said wheel; and
an elongate link coupled at a first end region to said second end region of said guide member and coupled at a second, opposite end region to said outer ring, pivotal movement of said guide member causing pulling of said link and rotation of said outer ring in the first direction.

11. The vehicle of claim 10, further comprising a roller attached to said frame and over which said link passes between coupling to said guide member and said outer ring.

12. The vehicle of claim 10, wherein said energy transfer system further comprises a drum fixed to said outer ring, said second end region of said link being connected to said drum.

13. The vehicle of claim 7, wherein said wheel includes an axle and said drive chain passes around said axle of said wheel, said energy transfer system comprising:
an overrunning clutch mechanism having an outer ring and an inner ring configured such that rotation of said outer ring in a first direction causes rotation of said inner ring while rotation of said outer ring in a second, opposite direction does not cause rotation of said inner ring, said inner ring being motively coupled to said drive chain such that rotation of said inner ring causes movement of said drive chain and results in rotation of said wheel; and
an elongate link coupled at a first end region to said second end region of said guide member and coupled at a second, opposite end region to said outer ring, pivotal movement of said guide member causing pulling of said link and rotation of said outer ring in the first direction.

14. The vehicle of claim 13, wherein said energy transfer system further comprises a drum fixed to said outer ring, said second end region of said link being connected to said drum.

15. The vehicle of claim 13, wherein said energy transfer system further comprises a transmission axle to which said inner ring is fixed, said main drive sprocket plate being fixed to said transmission axle, said drive chain passing around an outer periphery of said main drive sprocket plate.

16. The vehicle of claim 15, wherein each of said at least one drive mechanism further comprises at least one biasing member that biases said outer ring to rotate in the second direction, said at least one biasing member being arranged in connection with said transmission axle.

17. The vehicle of claim 13, each of said at least one drive mechanism further comprises at least one biasing member that biases said outer ring to rotate in the second direction.

18. The vehicle of claim 7, wherein said roller comprises a roller pad contacting an outer surface of said guide member and a bearing, the vehicle further comprising a pin fixed to said guide member and around which said bearing is arranged, said roller pad having a outer surface complementary to an outer surface of said guide member.

19. A vehicle, comprising:
a frame;
a seat mounted to said frame;
a wheel rotatably mounted on said frame and including an axle;
at least one drive mechanism that causes rotation of said wheel, each of said at least one drive mechanism comprising:
an arm pivotally attached at a first end region to said frame;
a weight arranged on said arm at an opposite, second end region;
a pedal attached to said weight, said pedal and thus said weight being movable by a user of the vehicle when present in said seat to cause pivoting of said arm; and an energy transfer system that converts pivotal movement of said arm into motive power to rotate said wheel,
said energy transfer system comprising:
an overrunning clutch mechanism having an outer ring and an inner ring configured such that rotation of said outer ring in a first direction causes rotation of said inner ring while rotation of said outer ring in a second, opposite direction does not cause rotation of said inner ring;
a drive chain passing around said axle of said wheel, said inner ring being motively coupled to said drive chain such that rotation of said inner ring causes movement of said drive chain and results in rotation of said wheel; and
an elongate link having a first end region that moves when said pedal moves and a second, opposite end region coupled to said outer ring, pivotal movement of said arm causing pulling of said link and rotation of said outer ring in the first direction;
a roller attached to said frame and over which said link passes.

20. A vehicle, comprising:
a frame;
a seat mounted to said frame;
a wheel rotatably mounted on said frame and including an axle; and
at least one drive mechanism that causes rotation of said wheel, each of said at least one drive mechanism comprising:
an arm pivotally attached at a first end region to said frame;
a weight arranged on said arm at an opposite, second end region;
a pedal attached to said weight, said pedal and thus said weight being movable by a user of the vehicle when present in said seat to cause pivoting of said arm; and
an energy transfer system that converts pivotal movement of said arm into motive power to rotate said wheel,
said energy transfer system comprising:
an overrunning clutch mechanism having an outer ring and an inner ring configured such that rotation of said outer ring in a first direction causes rotation of said inner ring while rotation of said outer ring in a second, opposite direction does not cause rotation of said inner ring;
a drive chain passing around said axle of said wheel, said inner ring being motively coupled to said drive chain such that rotation of said inner ring causes movement of said drive chain and results in rotation of said wheel;
an elongate link having a first end region that moves when said pedal moves and a second, opposite end region coupled to said outer ring, pivotal movement of said arm causing pulling of said link and rotation of said outer ring in the first direction; and
a drum fixed to said outer ring, said second end region of said link being connected to said drum.

21. A vehicle, comprising:
a frame;
a seat mounted to said frame;
a wheel rotatably mounted on said frame and including an axle; and
at least one drive mechanism that causes rotation of said wheel, each of said at least one drive mechanism comprising:
an arm pivotally attached at a first end region to said frame;
a weight arranged on said arm at an opposite, second end region;
a pedal attached to said weight, said pedal and thus said weight being movable by a user of the vehicle when present in said seat to cause pivoting of said arm;
an energy transfer system that converts pivotal movement of said arm into motive power to rotate said wheel, said energy transfer system comprising:
an overrunning clutch mechanism having an outer ring and an inner ring configured such that rotation of said outer ring in a first direction causes rotation of said inner ring while rotation of said outer ring in a second, opposite direction does not cause rotation of said inner ring;
a drive chain passing around said axle of said wheel, said inner ring being motively coupled to said drive chain such that rotation of said inner ring causes movement of said drive chain and results in rotation of said wheel; and
an elongate link having a first end region that moves when said pedal moves and a second, opposite end region coupled to said outer ring, pivotal movement of said arm causing pulling of said link and rotation of said outer ring in the first direction; and
at least one biasing member that biases said outer ring to rotate in the second direction.

* * * * *